(12) United States Patent
Zhao et al.

(10) Patent No.: US 11,057,727 B2
(45) Date of Patent: Jul. 6, 2021

(54) DYNAMIC POWER/CURRENT ALLOCATION AMONG GROUPS OF AUDIO AMPLIFIERS AND/OR HAPTIC DRIVERS

(71) Applicant: CIRRUS LOGIC INTERNATIONAL SEMICONDUCTOR, LTD., Edinburgh (GB)

(72) Inventors: Tian Zhao, Austin, TX (US); Jeffrey A. May, Dripping Springs, TX (US)

(73) Assignee: CIRRUS LOGIC, INC., Austin, TX (US)

( * ) Notice: Subject to any disclaimer, the term of this patent is extended or adjusted under 35 U.S.C. 154(b) by 0 days.

(21) Appl. No.: 16/987,631

(22) Filed: Aug. 7, 2020

(65) Prior Publication Data

US 2021/0120351 A1 Apr. 22, 2021

Related U.S. Application Data

(60) Provisional application No. 62/923,138, filed on Oct. 18, 2019.

(51) Int. Cl.
*H04R 29/00* (2006.01)
*H04R 3/12* (2006.01)
*G06F 1/30* (2006.01)

(52) U.S. Cl.
CPC ............ *H04R 29/002* (2013.01); *G06F 1/30* (2013.01); *H04R 3/12* (2013.01)

(58) Field of Classification Search
CPC ............ H04R 29/002; H04R 3/12; G06F 1/30
(Continued)

(56) References Cited

U.S. PATENT DOCUMENTS

| 4,873,493 A | 10/1989 | Fujiwara |
| 6,417,659 B1 | 7/2002 | Schroeder |

(Continued)

FOREIGN PATENT DOCUMENTS

| EP | 2712209 A1 | 3/2014 |
| WO | WO-2016040177 A1 | 3/2016 |
| WO | WO-2017087246 A1 | 5/2017 |

OTHER PUBLICATIONS

International Search Report and Written Opinion in PCT/US2020/054933 dated Dec. 31, 2020, 17 pages (pp. 1-17 in pdf).

(Continued)

*Primary Examiner* — William J Deane, Jr.
(74) *Attorney, Agent, or Firm* — Mitch Harris, Atty at Law, LLC; Andrew M. Harris

(57) ABSTRACT

An audio or haptic power output system manages and delivers power to multiple output transducers based on corresponding power or current limits that are adjusted dynamically according to measures of power or current that are required to generate power output signals from corresponding digital input values or signals. A power management subsystem controls electrical power or current consumed by power output stages that supply power to the transducers by comparing the measures of power or current required to generate the power output signals to the corresponding power or current limits, and limiting the power or current consumed by the individual power output stages measures of power or current exceeds the corresponding limits.

37 Claims, 6 Drawing Sheets

(58) Field of Classification Search
USPC .......................................................... 381/58
See application file for complete search history.

(56) References Cited

U.S. PATENT DOCUMENTS

| | | | |
|---|---|---|---|
| 6,871,050 B2 | 3/2005 | Wahl | |
| 7,539,466 B2 | 5/2009 | Tan et al. | |
| 8,036,402 B2 | 10/2011 | Furge | |
| 8,044,716 B1 | 10/2011 | Loeb et al. | |
| 8,064,614 B2 | 11/2011 | Sugii et al. | |
| 8,068,622 B2 | 11/2011 | Melanson et al. | |
| 8,645,144 B2 | 2/2014 | Le Blanc et al. | |
| 9,397,520 B2 | 7/2016 | Redpath et al. | |
| 9,438,181 B1 * | 9/2016 | Baker | H03F 1/0233 |
| 9,742,198 B2 * | 8/2017 | Barus | G06F 1/263 |
| 10,187,025 B1 | 1/2019 | May et al. | |
| 10,212,514 B2 | 2/2019 | Serwy et al. | |
| 10,231,050 B2 | 3/2019 | Serwy et al. | |
| 2013/0251163 A1 * | 9/2013 | Adamson | H04R 27/00 |
| | | | 381/58 |
| 2020/0142465 A1 * | 5/2020 | Jenne | G06F 1/3206 |

OTHER PUBLICATIONS

"Soft Clippers", Native Instruments, Mar. 4, 2007. downloaded from: https://www.nativeinstruments.com/forum/threads/soft-clippers. 46859/ on Oct. 9, 2020, 12 pages, (pp. 1-12 in pdf).

* cited by examiner

DYNAMIC POWER/CURRENT ALLOCATION AMONG GROUPS OF AUDIO AMPLIFIERS AND/OR HAPTIC DRIVERS

The present Application Claims priority under 35 U.S.C. § 119(e) to U.S. Provisional Patent Application 62/923,138 filed on Oct. 18, 2019, the disclosure of which is incorporated herein by reference.

BACKGROUND

1. Field of Disclosure

The field of representative embodiments of this disclosure relates to audio or haptic power output methods, circuits and systems that have limited power supply capabilities and/or constrain the current/power supplied to multiple power output circuits.

2. Background

Audio output systems that deliver power to multiple acoustic output transducers, such as loudspeakers or micro speakers, and haptic output drivers that supply energy to haptic feedback devices, are consumers of significant amounts of energy in battery-powered devices, such as mobile telephones. In general, when multiple amplifiers/drivers are supplying power to multiple transducers from a single input power source, the total power or current delivered to the transducers is limited by the power or current that may be delivered from the power source. For speakers, exceeding the deliverable power generally means that the audio output signal(s) will be clipped due to the power supply output capacitance discharging due to current being delivered to the transducers faster than the power supply may supply current to keep the power supply output capacitance charged. However, when multiple transducers are being supplied from a single power supply, some transducers may require more power/current than others, and, assuming power is apportioned evenly between amplifier stages, clipping may be caused by placing a limit on one amplifier, while excess current capability is present that is not being consumed by another amplifier.

Therefore, it would be advantageous to provide an improved performance in audio power output circuits, in particular when the audio power output circuits share a power supply with other circuits.

SUMMARY

Improved operation of audio and haptic power output systems may be accomplished in power management circuits and their methods of operation.

The methods, systems and circuits manage and delivers power to multiple output transducers based on corresponding power or current limits that are adjusted dynamically according to measures of power or current that are required to generate power output signals from corresponding digital input values or signals. A power management subsystem controls electrical power or current consumed by power output stages that supply power to the transducers by comparing the measures of power or current required to generate the power output signals to the corresponding power or current limits, and limiting the power or current consumed by the individual power output stages measures of power or current exceeds the corresponding limits.

The summary above is provided for brief explanation and does not restrict the scope of the Claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DETAILED DESCRIPTION OF ILLUSTRATIVE EMBODIMENT

The present disclosure encompasses methods, systems and circuits that control allocation of power or current to individual audio power amplifiers and haptic drivers in a multi-channel system, e.g., to transducers within battery-powered devices such as mobile telephones, tablets and laptop computers. The system or budgeted overall power or current is allocated for driving transducers based on corresponding power or current limits that are adjusted dynamically according to measures of power or current that are required to generate power output signals from corresponding digital input values or signals at the corresponding transducers. A power management subsystem controls electrical power or current consumed by power output stages that supply power to the transducers by comparing the measures of power or current required to generate the power output signals to the corresponding power or current limits, and limiting the power or current consumed by the individual power output stages measures of power or current exceeds the corresponding limits. While the following description is provided with reference to block diagrams, it is understood that the description included therein are applicable to a process that may be implemented by a digital signal processor executing a computer program product according to an embodiment of the disclosure as described in further detail below. Further, while the text below and the Claims use the terms "power or current" allocation/control and measurement, it is understood that it is the regulation of current (or voltage or a combination) that control the power delivered to (and thus consumed by), the channels described below.

Figure 1:
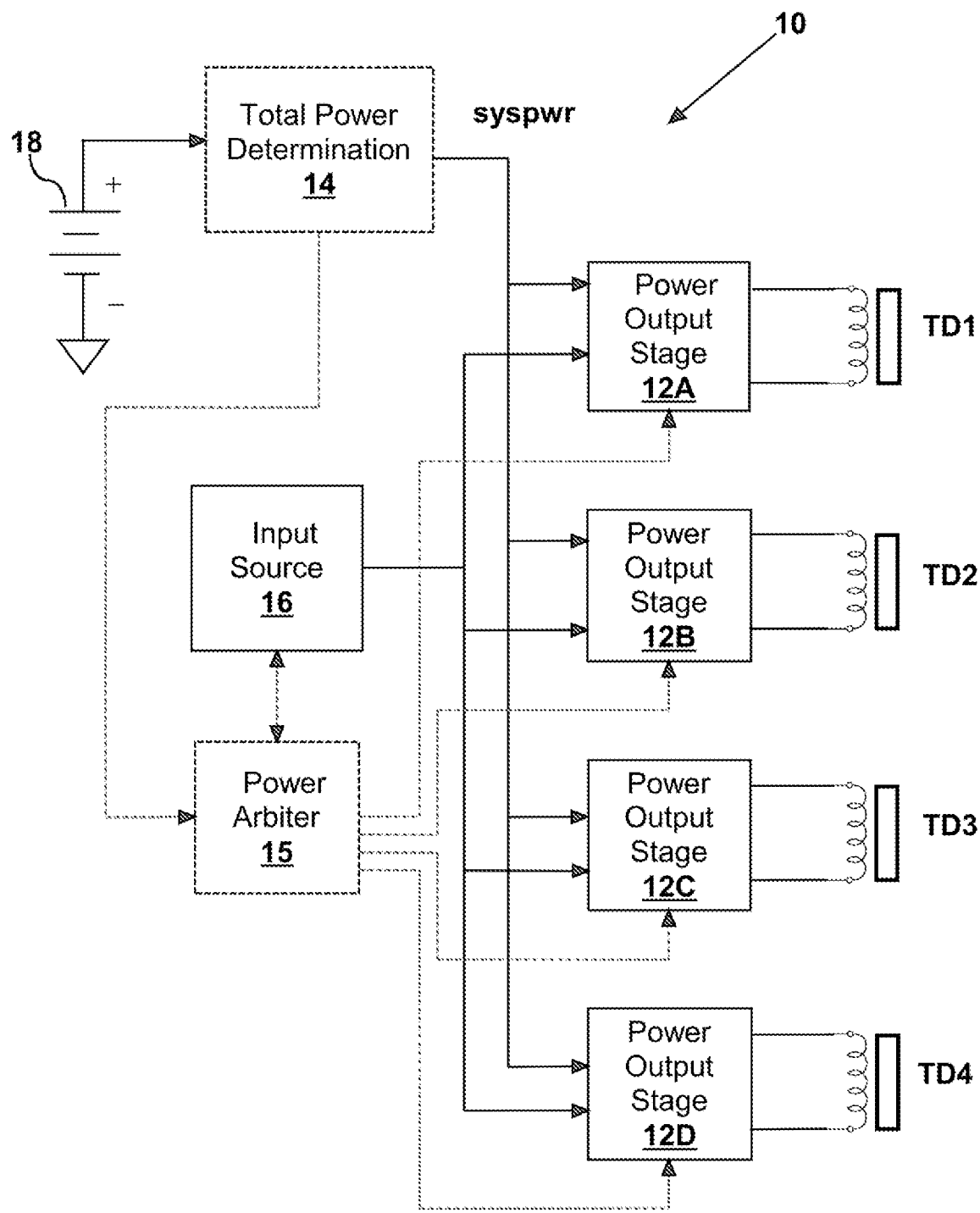
FIG. 1 is a block diagram of an example system in which techniques according to an embodiment of the disclosure are practiced.

FIG. 1 shows a block diagram of a multichannel audio power amplifier/haptic driver system 10 in which techniques according to an embodiment of the disclosure are practiced. A battery 18 delivers operating voltage and current syspwr that is shared by multiple power output stages 12A-12D. A total power determination block 14 provides information about the total system power (or current). Total power determination block 14 may be a voltage/current monitor that determines the total voltage and current available from battery 18, or may be provided by a knowledge of a total power budget allocated to a plurality of power output stages 12A-12D connected to battery 18, or alternatively by one or more power/current limiters that supply individual power output stages 12A-12D or the group of power output stages 12A-12D as a whole. Power output stages 12A-12D supply power to corresponding transducers TD1-TD4, which may be audio speakers such as micro-speakers, or haptic feedback devices such as linear resonant actuators (LRAs) or eccentric rotating mass (ERM) devices, or a combination of the two device types. An input source 16 represents a source of multiple audio or haptic vibratory pattern signals, that is reproduced by corresponding transducers TD1-TD4. If the signals provided to transducers TD1-TD4 are all within the system power budget available from battery 18, then the signals could all be reproduced without distortion or limiting of the current or power supplied by the individual power output stages 12A-12D to corresponding transducers TD1-TD4. However, an a priori power or current budgeting that, for example, allocates an equal ¼$^{th}$ of the available power or current for driving each of transducers TD1-TD4, will not deliver the best result. With knowledge of available power that is not being used to drive or more one of transducers TD1-TD4, additional power may be delivered to another one of transducers TD1-TD4 that has a higher (momentary) power demand. Therefore, multichannel audio power amplifier/haptic driver system 10 includes a power arbiter 15 that uses information about the power or current required by transducers TD1-TD4 and system power information from total power determination block 14 to dynamically allocate available system power or current between individual power output stages 12A-12D. While power arbiter 15 is shown as a centralized arbiter, power arbiter 15 may alternatively be distributed across power output stages 12A-12D, or may combine central and distributed power arbitration and allocation, as will be illustrated in examples below. Power arbiter 15 may use signal content of the signals delivered by input source 16 to power output stages 12A-12D in a feed-forward scheme in order to determine corresponding power or current limits for each of power output stages 12A-12D, which may be enforced by limiting the current that the individual power output stages 12A-12D may draw from battery 18, or by adjusting the amplitude of the audio or haptic pattern signals that are reproduced by power output stages 12A-12D. When the signal content is used to determine current/power consumption, the information is generally gathered on frames of audio samples, and then the control is applied when the frame of audio samples is delivered for reproduction to power output stages 12A-12D. The impedances of transducers TD1-TD4, which may either be determined from voltage-current measurements, retrieved from system configuration storage, or assumed equal and constant values are then used to determine a measure of the actual current/power that will be required to reproduce the audio content for a frame of samples. Power may be determined as peak (greatest sample value), root-mean-square (RMS) or average power according to the samples in an audio (or haptic control pattern) frame buffer. Alternatively, or in combination, power arbiter 15 may use a feedback scheme, in which measurements of actual power/current consumed by power output stages 12A-12D is used to determine the dynamic power or current limits, so that the sum of the current levels (or power levels) does not exceed the system maximum. If the feed-forward and feedback schemes are combined, it may be useful to implement an adaptive scheme in which a rate at which the dynamic current/power limits are adjusted according to the feed-forward information is updated by comparison with feedback values determines after updated limits have been applied. Any of the feed-forward, feedback or combined/adaptive control schemes may be implemented in the various control architectures described below with reference to FIG. 3 and FIG. 4.

Figure 2A:
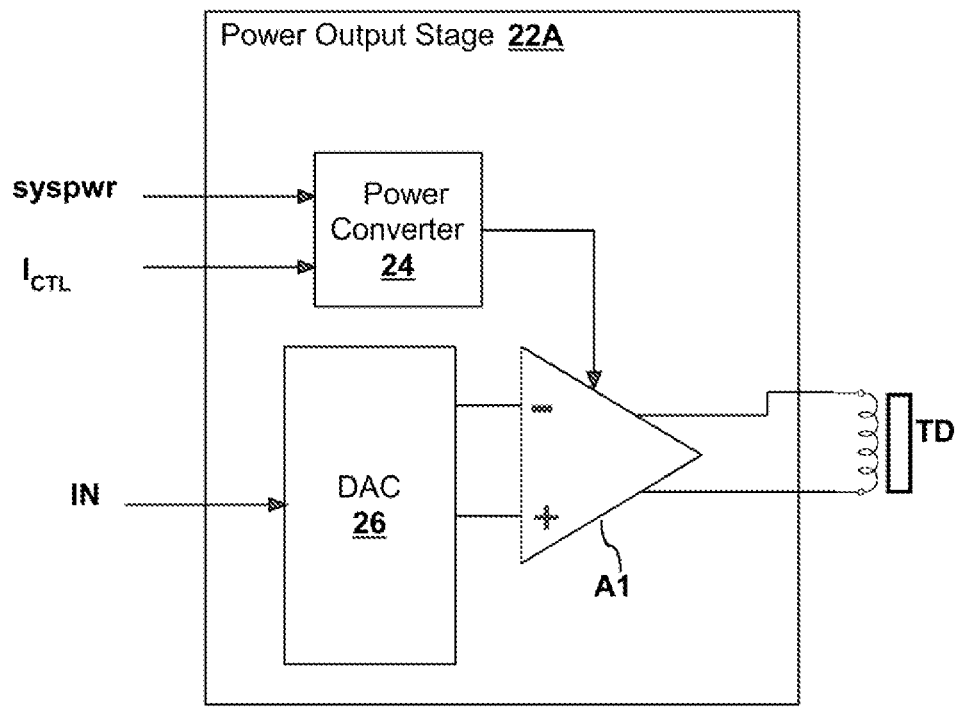
FIG. 2A and FIG. 2B are block diagrams illustrating example power output stages that may be used to implement power output stages 12A-12D in the example system of FIG. 1.
Figure 2B:
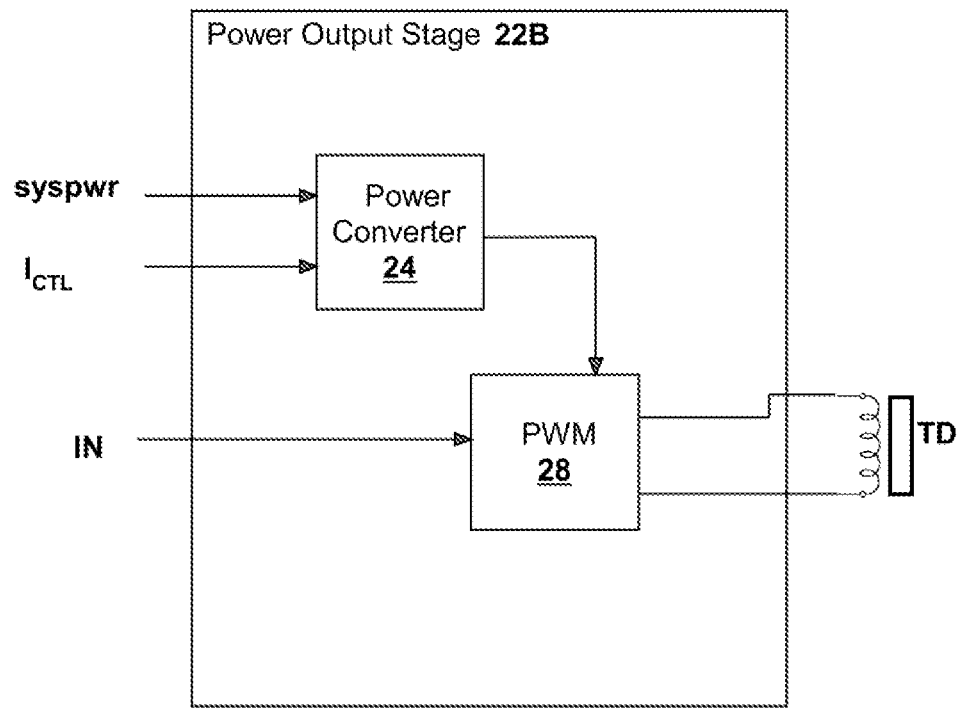

FIG. 2A and FIG. 2B are block diagrams of example power output stages 12A-12D that may be used within multichannel audio power amplifier/haptic driver system 10 according to embodiments of the disclosure. FIG. 2A illustrates a power output stage 22A that receives a digital audio/haptic pattern input signal IN and converts input signal IN to an analog signal using a digital-to-analog converter (DAC) 26 that provides a differential input signal pair to the inputs of a power amplifier A1 that generates the output signals which drive transducer TD. A control input $I_{CTL}$ sets a maximum current level that may be drawn by a power converter 24 that supplies power to power amplifier A1 from system power supply output syspwr.

FIG. 2B shows another example embodiment of a power output stage 22B that may be used instead of power output stage 22A for some or all of the power output stages included in multichannel audio power amplifier/haptic driver system 10. Rather than using an analog amplifier and a DAC, power output stage 22B includes a pulse-width-modulator (PWM) 28 with power output switches that directly drive transducer TD with a waveform that has a pulse width determined by the value of digital audio/haptic pattern input signal IN. Power converter 24 operates in a manner similar to that described above, for FIG. 2A, responding to a control input $I_{CTL}$ sets a maximum current level that may be drawn by power converter 24.

Figure 3:
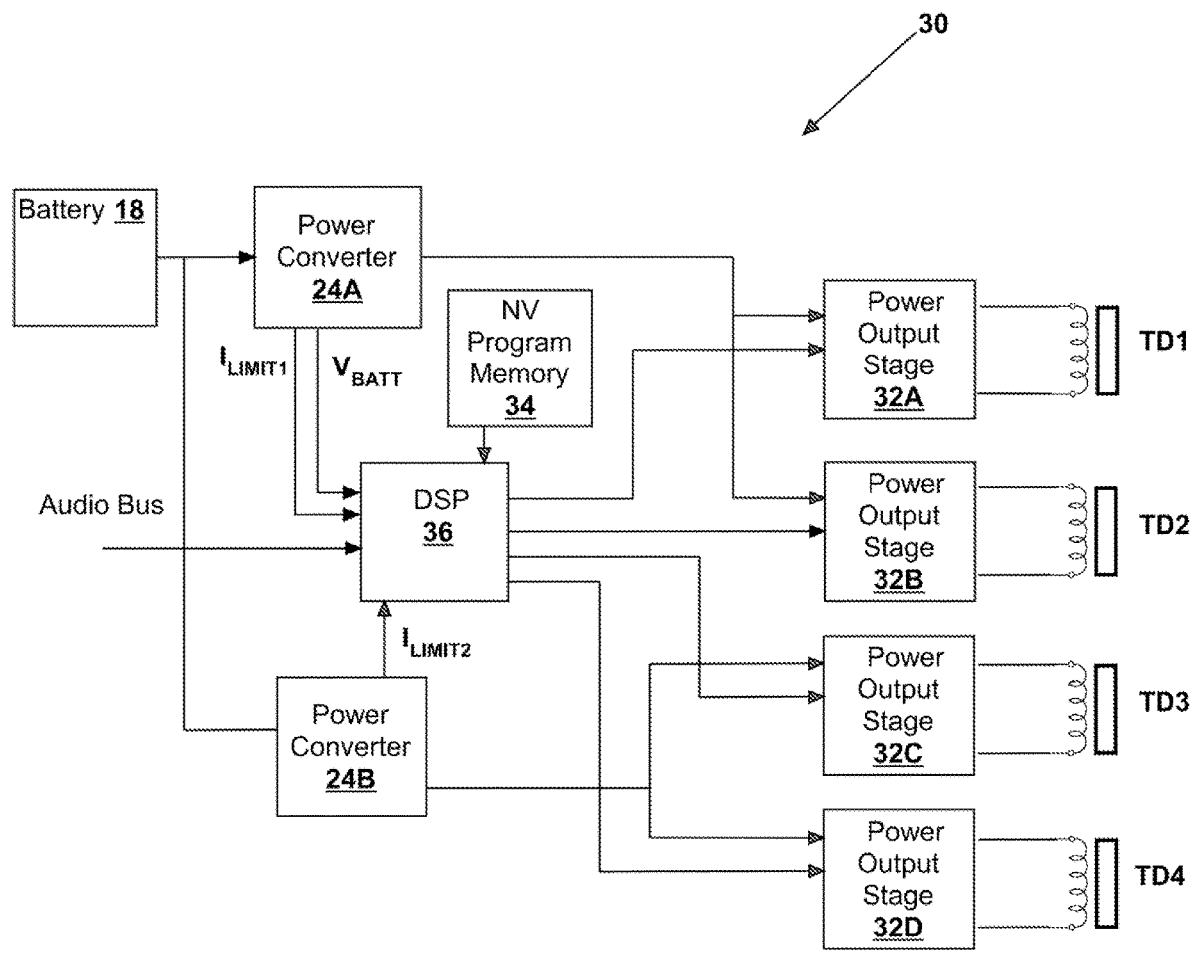
FIG. 3 is a block diagram illustrating an example system in accordance with an embodiment of the disclosure.

As mentioned above, the current/power arbitration scheme may be centralized or distributed or some combination of the two forms of arbitration. Within those categories, there are further variations of current/power allocation schemes that may be implemented by multichannel audio power amplifier/haptic driver system 10, in accordance with various embodiments of the disclosure. For example, in a multichannel audio power amplifier/haptic driver system 30 as shown in FIG. 3, a digital signal processor (DSP) 36 receives all of the information for all of the channels from input Audio Bus. Program code that is stored in a non-volatile (NV) program memory 34 that implements a current/power arbiter may determine, by observing the values of the input waveform for each channel, the current/power that will be required to reproduce those signals at transducers TD1-TD4. The arbiter program may then dynamically reallocate current from channels that have excess current available, by receiving information about system power/current available from battery 18 and two different power converters 24A and 24B. For example, if the arbiter program determines that the signal level provided to transducer TD1 will cause the corresponding power budget to be exceeded by 20%, the arbiter program may adjust the corresponding input signal by scaling the values of the corresponding input signal downward by a factor of $1/\sqrt{1.2} \approx 0.913$ or less, by applying an analog gain of 0.913 or less, or by adjusting the corresponding current limit provided to power converter 24 within the corresponding power output stage 32A-32D downward by a factor of $1/1.2 \approx 0.834$ or less. Similarly, if the power arbiter program observes that the signal level provided to transducer TD1 will use only 80% of the corresponding power budget, the arbiter program may reduce the power budget in favor of another channel that may be operating close to a power-limited state, or may cease power-limiting another channel that is in a power-limited state. Power converter 24A provides operating voltage and current to power output stages 32A and 32B, which form a first group of power output stages. Power converter 24B provides operating voltage and current to power output stages 32C and 32D, which form a second group of power output stages. In an example embodiment according to FIG. 3, multichannel audio power amplifier/haptic driver system 30 arbitrates current/power between power output stages 32A and 32B according to a total power budget for the first group and arbitrates current/power between power output stages 32C and 32D according to a total power budget for the second group. Separately, multichannel audio power amplifier/haptic driver system 30 may re-allocate the total current/power budgets provided for power converter 24A and power converter 24B according to measurement information provided from power converter 24A and power converter 24B, e.g. the current limit values holm and holm that reveal the charging current provided from power converter 24A and power converter 24B during cycles in which their output voltage is being re-established after times of high current drain by one or more of power output stages TD1-TD4. Power converter 24A also provides a measurement of battery voltage $V_{BATT}$, so that the overall system current/power budget to be split between power converter 24A and power converter 24B may be determined. Thus, multichannel audio power amplifier/haptic driver system 30 provides an example of centralized current/power arbitration. While the above example uses a DSP to provide programmatic processing, it is understood that other cores, such as a microcontroller, microprocessor may alternatively be used to provide the same functionality.

Figure 4:
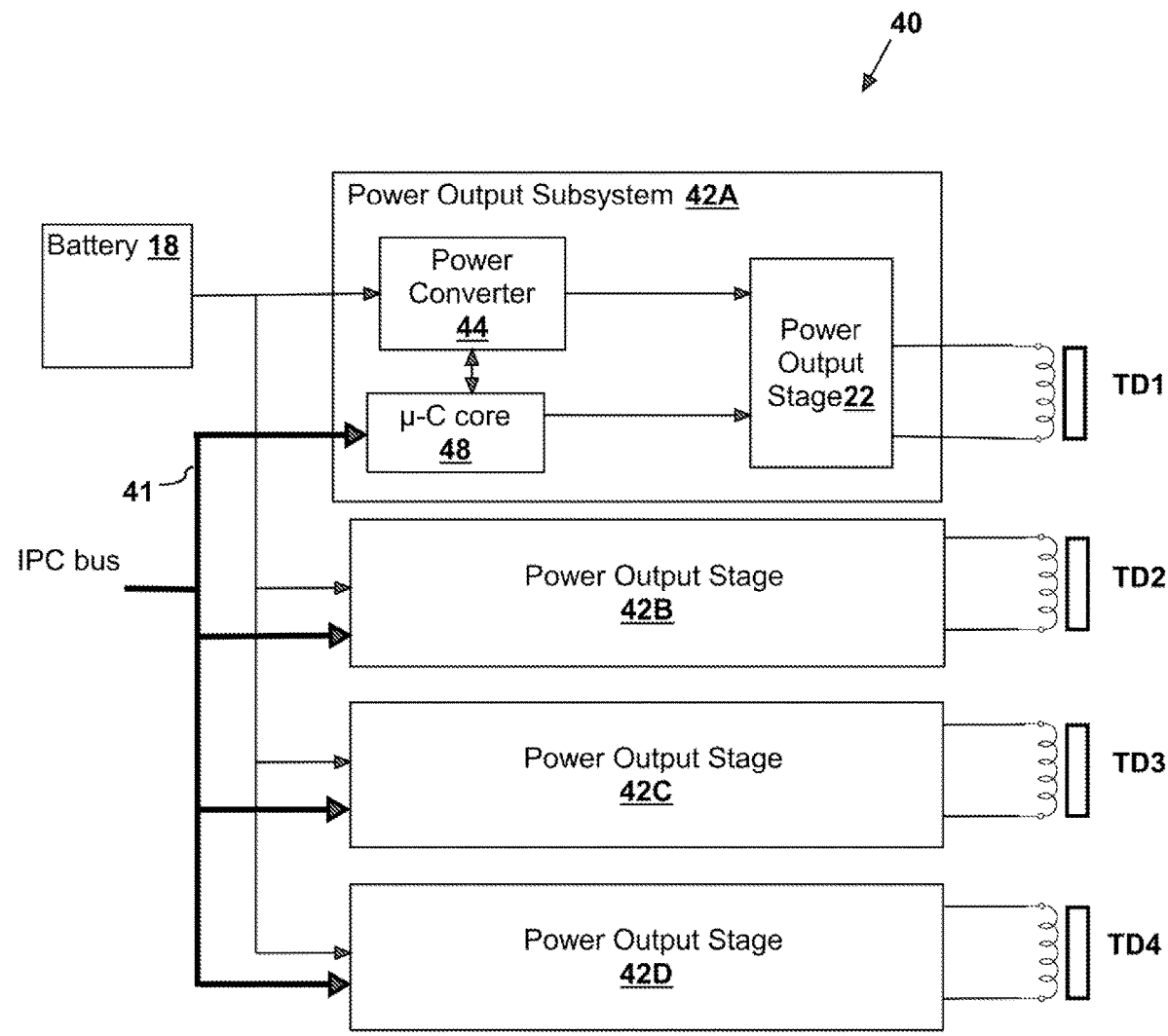
FIG. 4 is a block diagram illustrating another example system in accordance with an embodiment of the disclosure.

Referring now to FIG. 4, another example of a multichannel audio power amplifier/haptic driver system 40 is shown, in which the current/power arbitration function is distributed among multiple power output subsystems 42A that drive transducers TD1-TD4. In the example embodiment, an inter-processor communication (IPC) bus 41 provides digital audio information to, and may share control and configuration information between, a microcontroller (μ-C) core 48. Microcontroller core 48 controls and receives current/power consumption information from a power converter 44 in each of multiple power output subsystems 42A-42D, allowing energy from battery 18 to be directly allocated by power output subsystems 42A-42D. Information that is shared may include transducer impedance determined from measurements of consumed current/power and a known power converter output voltage, amplifier gain values, the current/power consumption values and other information available within power output subsystems 42A-42D.

A number of different schemes may be implemented in example multichannel audio power amplifier/haptic driver system 40, and microcontroller (μ-C) core 48 may not be needed in each of power output subsystems 42A-42D. For example, power output subsystem 42A may be a main subsystem that controls allocation of current/power for both of power output subsystem 42A and 42B as a group, and may communicate control information that sets a maximum current/power output level of power converter 44 in (secondary) power output subsystem 42B, or may set a gain value applied to the digital input signal received by power output subsystem 42B that limits the current/power allocated for transducer TD2. Power output subsystem 42C and 42D may then form another main-secondary pair as another group. The above example is an example of a hierarchical system in which power/current is allocated for individual groups to fit within a system available current/power maximum, and then within the individual groups, the current/power is shared via arbitration. Alternatively, power output subsystems 42A-42D may operate in a peer-peer manner in which information about current/power consumption is shared between power output subsystems 42A-42D and then allocated according to an algorithm, such as a minimum-guaranteed current/power delivery scheme in which only unused or excess current/power from one of or more of power output subsystems 42A-42D is made available for allocation to other ones of power output subsystems 42A-42D. In the peer-peer allocation scheme, a hierarchy may also be imposed, either for system design considerations, or due to architecture considerations such as a lack of a common audio or control bus existing between the groups. The examples given above of groups of two with pairs of power output stages in each group is only illustrative, and any number of power output stages may be grouped with any number of members in each group.

Figure 5A:
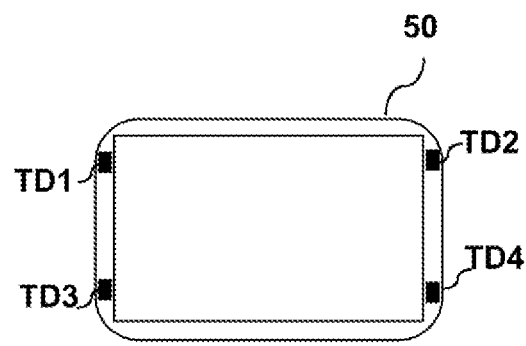
FIGS. 5A-5C illustrate a changing system configuration in accordance with an embodiment of the disclosure.
Figure 5B:
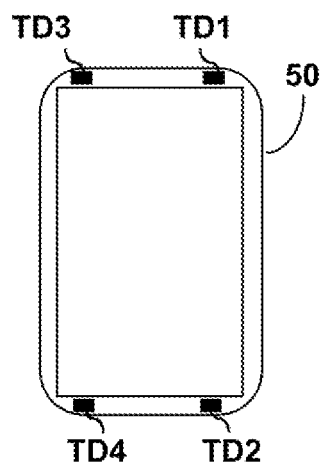
Figure 5C:
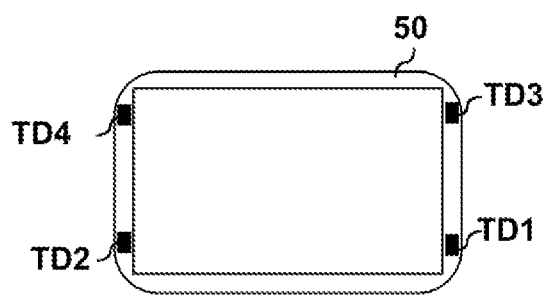

Initialization of the above-described systems may be performed, for example, by setting equal partitions of current/power $P_{alloc}[n]$=system available power/N where N=the number of channels. $P_{alloc}[n]$ then becomes the power available to each of power output subsystems 42A-42D. Alternatively, $P_{alloc}[n]$ could be set to specific alternate initial values according to a known system configuration. As operation proceeds, if the required channel current/power $P_{ch}[n]$ exceeds the initial partition and if the surplus current/power $P_{alloc}[n]<P_{ch}[n]$, for some channel n then, if $P_{alloc}[m]>P_{ch}[m]$ for at least one other channel m, a surplus amount of power $P_{alloc}[m]-P_{ch}[m]$ may be reassigned to increase $P_{alloc}[n]$. System configuration information may also be used to update a current/power allocation scheme. For example, as illustrated in FIGS. 5A-5C, the orientation of a tablet 50 may be used to control the allocation of current/power to transducers TD1-TD4. In FIG. 5A, in a default orientation of tablet 50, transducers TD1 and TD2 are located at a top of table 50 and are treated as high-frequency drivers and transducers TD3 and TD4 are treated as low frequency drivers. Transducers TD1 and TD2 are power-managed in a first group and transducers TD3 and TD4 are power-managed in a second group. As such, transducers TD1 and TD2 are allocated less total power as a group than that allocated to transducers TD3 and TD4 in the second group, which are treated as low-frequency drivers, even though transducers TD1-TD4 may be identical. When the orientation of tablet 50 changes to that shown in FIG. 5B a system control signal is sent, e.g., over IPC bus 41 in FIG. 4, to indicate the new orientation, and the groups are re-assigned, with transducers TD3 and TD1 now forming the first group (which are treated as high-frequency drivers) and transducers TD4 and TD2 forming the second group (which are treated as low-frequency drivers). If the orientation becomes that of FIG. 5C instead, the power allocations are redistributed between the first group and the second group, with TD1 and TD2 remaining in the same first group and TD3 and TD4 remaining in the same second group. The power allocations are then swapped between the first group and the second group, so that the first group is treated as low-frequency driver group and the second group is treated as the high-frequency driver group.

Figure 6:
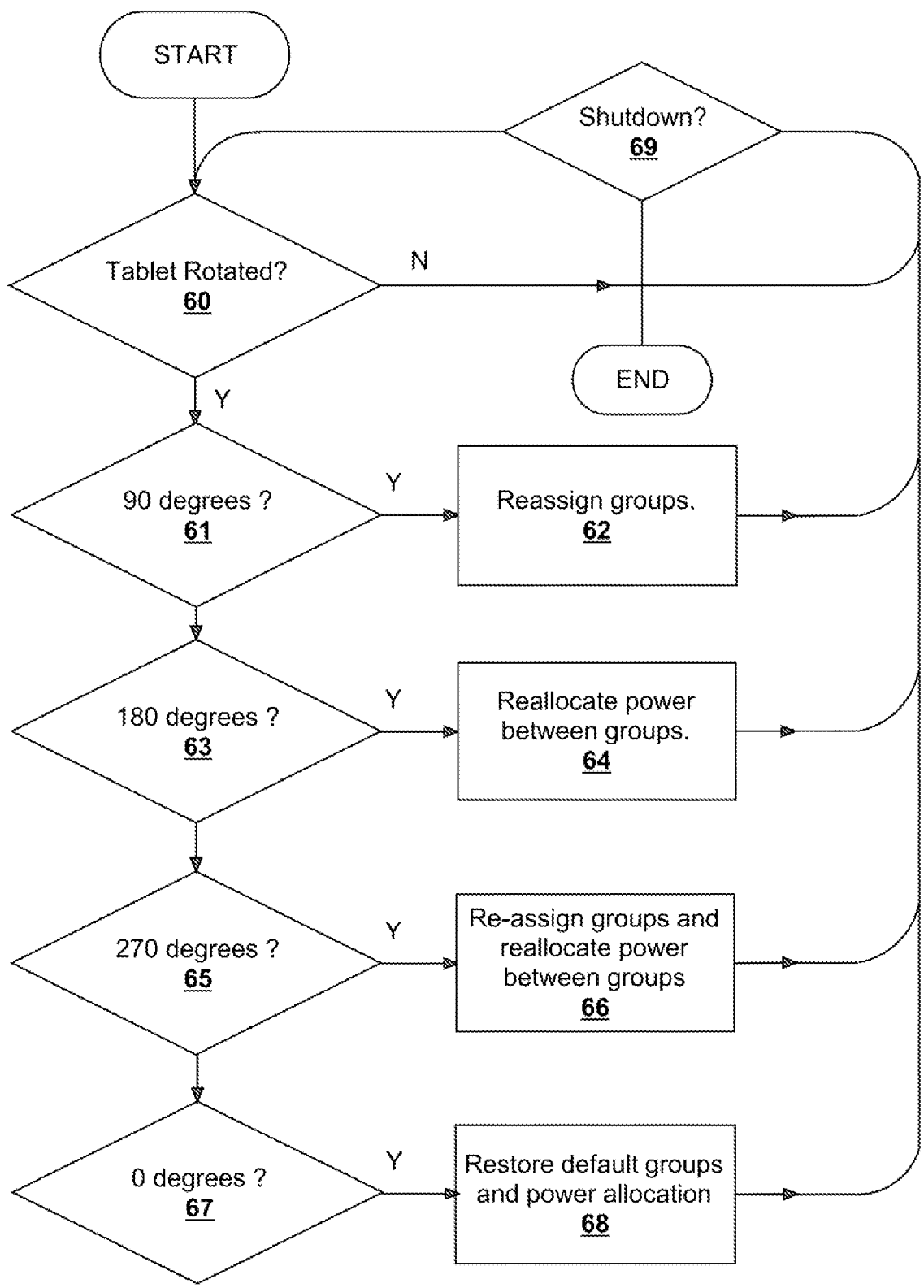
FIG. 6 is a flow chart illustrating techniques in accordance with an embodiment of the disclosure.

Referring now to FIG. 6, a method according to an embodiment of the disclosure is illustrated in a flowchart that further describes the operation described above with reference to FIGS. 5A-5C. Until tablet 50 is rotated (decision 60), operation continues according to current/power allocations until the tablet is shut down (decision 69). If the tablet is rotated (decision 60), and if the rotation is 90 degrees, e.g., as in FIG. 5B, (decision 61), the groups are re-assigned as described above (step 62). Otherwise, if the rotation is 180 degrees, e.g., FIG. 5C (decision 63), then the power/current budgets are re-allocated between groups (step 64). If the rotation is 270 degrees (decision 65), then both the groups are re-assigned and the power/current is re-allocated between the groups (step 66). If the rotation is 0 degrees (decision 67), the default groups and power allocations are restored (step 68).

As mentioned above portions or all of the disclosed process may be carried out by the execution of a collection of program instructions forming a computer program product stored on a non-volatile memory, but that also exist outside of the non-volatile memory in tangible forms of storage forming a computer-readable storage medium. The computer-readable storage medium may be, for example, but is not limited to, an electronic storage device, a magnetic storage device, an optical storage device, an electromagnetic storage device, a semiconductor storage device, or any suitable combination of the foregoing. Specific examples of the computer-readable storage medium includes the following: a hard disk, semiconductor volatile and non-volatile memory devices, a portable compact disc read-only memory (CD-ROM) or a digital versatile disk (DVD), a memory stick, a floppy disk or other suitable storage device not specifically enumerated. A computer-readable storage medium, as used herein, is not to be construed as being transitory signals, such as transmission line or radio waves or electrical signals transmitted through a wire. It is understood that blocks of the block diagrams described above may be implemented by computer-readable program instructions. These computer readable program instructions may also be stored in other storage forms as mentioned above and may be downloaded into a non-volatile memory for execution therefrom. However, the collection of instructions stored on media other than system non-volatile memory described above also form a computer program product that is an article of manufacture including instructions which implement aspects of the functions/actions specified in the block diagram block or blocks.

In summary, the instant disclosure discloses a power output system for delivering power to multiple audio or haptic transducers. The power output system includes a plurality of power output stages that generate corresponding ones of the power output signals from a corresponding plurality of input values or signals, at least one power management subsystem that controls electrical power or current consumed by the power output stages by comparing measures of a power or current required to generate the individual power output signals to corresponding power or current limits for the power output stages, and limiting the power or current consumed by the individual power output stages if the corresponding measures of the power or current exceed the corresponding power or current limits. The corresponding power or current limits are adjusted dynamically in conformity with the measures of the power or current required to generate the individual power output signals.

The measures of the power or current required to generate individual ones of the power output signals may be computed from the corresponding input values or signals and/or determined from past or present measurements of actual power or current drawn by the corresponding power output stages. The past or present measurements of the actual power or current may be computed from values received from power supplies that supply power to the corresponding power output stages and may be computed from the corresponding input values or signals in combination with the past or present measurements of actual power or current drawn by the corresponding power output stages. The at least one power management subsystem may be a plurality of power management subsystems that control the electrical power or current consumed by a corresponding one of the power output stages and individual ones of the plurality of power management subsystems may share the measures of the power or current required to generate the corresponding power output signals with other ones of the plurality of power management subsystems. The individual power management subsystems may determine their corresponding power or current limit by applying an algorithm that combines the measures of the power or current shared by the other ones of the plurality of power management subsystems to determine an available power or current budget. Individual ones of the plurality of power management subsystems may communicate the measures of power or current required to generate the corresponding power output signals to another one of the plurality of power management subsystems, and the individual power management subsystems may determine their corresponding power or current limit by determining an available power or current budget from the measure of power or current received from the other power management subsystem. The plurality of power output stages may receive the corresponding plurality of input values from a multiplexed source that encodes the corresponding plurality of input values for the plurality of power output stages, and individual ones of the plurality of power management systems may compute the measures of the power or current required to generate the power output signals for the plurality of power output stages from the corresponding input values or signals in the multiplexed source, so that the individual ones of the plurality of power management systems adjust their corresponding power or current limit dynamically in conformity with the plurality of input values for the plurality of power output stages. The at least one power management subsystem may be a central power management subsystem that sets the individual power or current limits for the power output stages. The at least one power management subsystem may adjust the power or current limits such that a sum of the power or current limits is less than or equal to a system power or current budget. The plurality of power output stages may be divided into multiple groups of multiple power output stages, and the at least one power management subsystem may allocate system power or current budget among the multiple groups according to corresponding group power or current budgets. The at least one power management subsystem may allocate power or current according to the group power or current budgets to the power output stages within the corresponding groups. The at least one power management system may adjust the group power or current budgets in response to a system configuration change. The system configuration signal may indicate an orientation of a device incorporating the audio or haptic power output system, and the multiple groups of multiple power output stages may include a first group for supplying power to speakers along a first edge of the device and a second group for supplying power to speakers along an opposite edge of the device. The at least one power management system may reallocate the group power or current budgets for the first group and the second group or reassigning at least some of the speakers between the first group and the second group, in response to the system configuration change indicating that the device has been rotated. The power output signals may be audio power signals for driving audio output transducers and the plurality of input values or signals may be audio sample values or signals and/or the power output signals may be vibratory power signals for driving haptic devices, and the plurality of input values or signals haptic operating values or signals.

While the disclosure has shown and described particular embodiments of the techniques disclosed herein, it will be understood by those skilled in the art that the foregoing and other changes in form, and details may be made therein without departing from the spirit and scope of the disclosure. For example, the techniques of the disclosed embodiments may be combined with system power management functions that select levels of energy use constraint.

What is claimed is:

1. An audio or haptic power output system that delivers a plurality of power output signals to corresponding output transducers, comprising:
    a plurality of power output stages that generate corresponding ones of the power output signals from a corresponding plurality of input values or signals; and
    at least one power management subsystem that controls electrical power or current consumed by the power output stages by comparing measures of a power or current required to generate the individual power output signals to corresponding power or current limits for the power output stages, and limiting the power or current consumed by the individual power output stages if the corresponding measures of the power or current exceed the corresponding power or current limits, wherein the corresponding power or current limits are adjusted dynamically in conformity with the measures of the power or current required to generate the individual power output signals.

2. The audio or haptic power output system of claim 1, wherein the measures of the power or current required to generate individual ones of the power output signals are computed from the corresponding input values or signals.

3. The audio or haptic power output system of claim 1, wherein the measures of the power or current required to generate the corresponding power output signals are determined from past or present measurements of actual power or current drawn by the corresponding power output stages.

4. The audio or haptic power output system of claim 3, wherein the past or present measurements of the actual power or current are computed from values received from power supplies that supply power to the corresponding power output stages.

5. The audio or haptic power output system of claim 3, wherein the measures of the power or current required to generate individual ones of the power output signals are further computed from the corresponding input values or signals in combination with the past or present measurements of actual power or current drawn by the corresponding power output stages.

6. The audio or haptic power output system of claim 1, wherein the at least one power management subsystem is a plurality of power management subsystems that control the electrical power or current consumed by a corresponding one of the power output stages.

7. The audio or haptic power output system of claim 6, wherein individual ones of the plurality of power management subsystems share the measures of the power or current required to generate the corresponding power output signals with other ones of the plurality of power management subsystems, and wherein the individual power management subsystems determine their corresponding power or current limit by applying an algorithm that combines the measures of the power or current shared by the other ones of the plurality of power management subsystems to determine an available power or current budget.

8. The audio or haptic power output system of claim 6, wherein individual ones of the plurality of power management subsystems communicate the measures of power or current required to generate the corresponding power output signals to another one of the plurality of power management subsystems, and wherein the individual power management subsystems determine their corresponding power or current limit by determining an available power or current budget from the measure of power or current received from the other power management subsystem.

9. The audio or haptic power output system of claim 6, wherein the plurality of power output stages receive the corresponding plurality of input values from a multiplexed source that encodes the corresponding plurality of input values for the plurality of power output stages, wherein individual ones of the plurality of power management systems compute the measures of the power or current required to generate the power output signals for the plurality of power output stages from the corresponding input values or signals in the multiplexed source, whereby the individual ones of the plurality of power management systems adjust their corresponding power or current limit dynamically in conformity with the plurality of input values for the plurality of power output stages.

10. The audio or haptic power output system of claim 1, wherein the at least one power management subsystem is a central power management subsystem that sets the individual power or current limits for the power output stages.

11. The audio or haptic power output system of claim 1, wherein the at least one power management subsystem adjusts the power or current limits such that a sum of the power or current limits is less than or equal to a system power or current budget.

12. The audio or haptic power output system of claim 1, wherein the plurality of power output stages are divided into multiple groups of multiple power output stages, and wherein the at least one power management subsystem allocates system power or current budget among the multiple groups according to corresponding group power or current budgets, and wherein the at least one power management subsystem allocates power or current according to the group power or current budgets to the power output stages within the corresponding groups.

13. The audio or haptic power output system of claim 12, wherein the at least one power management system adjusts the group power or current budgets in response to a system configuration change.

14. The audio or haptic power output system of claim 13, wherein the system configuration signal indicates an orientation of a device incorporating the audio or haptic power output system, wherein the multiple groups of multiple power output stages include a first group for supplying power to speakers along a first edge of the device and a second group for supplying power to speakers along an opposite edge of the device, and wherein the at least one power management system reallocates the group power or current budgets for the first group and the second group or reassigning at least some of the speakers between the first group and the second group, in response to the system configuration change indicating that the device has been rotated.

15. The audio or haptic power output system of claim 1, wherein the power output signals are audio power signals for driving audio output transducers, and wherein the plurality of input values or signals are audio sample values or signals.

16. The audio or haptic power output system of claim 1, wherein the power output signals are vibratory power signals for driving haptic devices, and wherein the plurality of input values or signals are haptic operating values or signals.

17. The audio or haptic power output system of claim 1, wherein the corresponding power or current limits are adjusted dynamically in conformity with the measures of the power or current required to generate the individual power output signals, so that unused power or current available from first ones of the plurality of power output stages is made available to other second ones of the plurality of power output stages for which the power or current consumed would otherwise be limited.

18. A method of managing electrical power or current provided in a power output system that delivers a plurality of power output signals to corresponding haptic or audio output transducers from a plurality of power output stages, the method comprising:
   comparing measures of a power or current required to generate the individual power output signals to corresponding power or current limits for the power output stages;
   limiting the power or current consumed by the individual power output stages if the corresponding measures of the power or current exceed the corresponding power or current limits;
   generating the individual power output signals from corresponding ones of the plurality of input values or signals; and
   adjusting the individual power or current limits are dynamically in conformity with the measures of the power or current required to generate the individual power output signals.

19. The method of claim 18, further comprising computing the measures of the power or current required to generate the individual power output signals from the corresponding input values or signals.

20. The method of claim 18, further comprising determining the measures of the power or current required to generate the corresponding power output signals from past or present measurements of actual power or current drawn by the corresponding power output stages.

21. The method of claim 20, further comprising computing the past or present measurements of the actual power or current from values received from power supplies that supply power to the corresponding power output stages.

22. The method of claim 20, wherein the measures of the power or current required to generate individual ones of the power output signals are further computed from the corresponding input values or signals in combination with the past or present measurements of actual power or current drawn by the corresponding power output stages.

23. The method of claim 18, wherein the comparing and adjusting are performed by a plurality of power management subsystems that control the electrical power or current consumed by a corresponding one of the power output stages.

24. The method of claim 23, further comprising:
   sharing the measures of the power or current required to generate the corresponding power output signals from individual ones of the plurality of power management subsystems with other ones of the plurality of power management subsystems; and
   the individual power management subsystems determining their corresponding power or current limit by applying an algorithm that combines the measures of the power or current shared by the other ones of the plurality of power management subsystems to determine an available power or current budget.

25. The method of claim 23, further comprising:
   individual ones of the plurality of power management subsystems communicating the measures of power or current required to generate the corresponding power output signals to another one of the plurality of power management subsystems; and
   the individual power management subsystems determining their corresponding power or current limit by determining an available power or current budget from the measure of power or current received from the other power management subsystem.

26. The method of claim 23, further comprising:
   the plurality of power output stages receiving the corresponding plurality of input values from a multiplexed source that encodes the corresponding plurality of input values for the plurality of power output stages; and
   the individual ones of the plurality of power management systems computing the measures of the power or current required to generate the power output signals for the plurality of power output stages from the corresponding input values or signals in the multiplexed source, wherein the adjusting of the individual power or current limits is performed dynamically in conformity with the plurality of input values for the plurality of power output stages.

27. The method of claim 18, wherein the comparing and adjusting are performed by a central power management subsystem that sets the individual power or current limits for the power output stages.

28. The method of claim 18, wherein the adjusting adjusts the power or current limits such that a sum of the power or current limits is less than or equal to a system power or current budget.

29. The method of claim 18, wherein the plurality of power output stages are divided into a multiple groups of multiple power output stages, and wherein the method further comprises:
   allocating the system power or current budget among the multiple groups according to corresponding group power or current budgets; and
   allocating power or current according to the group power or current budgets to the power output stages within the corresponding groups.

30. The method of claim 29, wherein the adjusting adjusts the group power or current budgets in response to a system configuration change.

31. The method of claim 30, wherein the system configuration signal indicates an orientation of a device incorporating the audio or haptic power output system, wherein the multiple groups of multiple power output stages include a first group for supplying power to speakers along a first edge of the device and a second group for supplying power to speakers along an opposite edge of the device, and wherein the method further comprises reallocating the group power or current budgets for the first group and the second group or reassigning at least some of the speakers between the first group and the second group, in response to the system configuration change indicating that the device has been rotated.

32. The method of claim 18, wherein the power output signals are audio power signals for driving audio output transducers, and wherein the plurality of input values or signals are audio sample values or signals.

33. The method of claim 18, wherein the power output signals are vibratory power signals for driving haptic devices, and wherein the plurality of input values or signals are haptic operating values or signals.

34. The method of claim 18, wherein the adjusting adjusts the corresponding power or current limits so that unused power or current available from first ones of the plurality of power output stages is made available to other second ones of the plurality of power output stages for which the power or current consumed would otherwise be limited by the limiting.

35. A computer program product comprising program instructions stored in a computer-readable storage that is not a signal or propagating wave, wherein the computer program product, when executed by a processor, manages electrical power or current provided in a power output system that delivers a plurality of power output signals to corresponding haptic or audio output transducers from a plurality of power output stages, the program instructions comprising:

program instructions for, responsive to samples of a plurality of input values corresponding to an power or current required to generate the individual power output signals, comparing the measures of the power or current to corresponding power or current limits for the power output stages;

program instructions for, limiting the power or current consumed by the individual power output stages if the corresponding measures of the power or current exceed the corresponding power or current limits; and program instructions for adjusting the individual power or current limits dynamically in conformity with the measures of the power or current required to generate the individual power output signals.

36. The computer program product of claim 35, wherein the samples of the plurality of input values represent the plurality of power output signals.

37. The computer program product of claim 35, wherein the samples of the plurality of input values represent past power or current consumed in generating the plurality of power output signals.

* * * * *